UNITED STATES PATENT OFFICE.

JOKICHI TAKAMINE, OF PEORIA, ILLINOIS.

ALCOHOLIC-FERMENT MASH.

SPECIFICATION forming part of Letters Patent No. 525,825, dated September 11, 1894.

Application filed July 23, 1892. Renewed July 9, 1894. Serial No. 517,018. (No specimens.)

*To all whom it may concern:*

Be it known that I, JOKICHI TAKAMINE, a subject of the Emperor of Japan, residing at Peoria, in the county of Peoria and State of Illinois, have invented new and useful Improvements in Alcoholic-Ferment Mash for Developing Active Ferment-Cells, of which the following is a specification.

The object of my invention is to prepare an alcoholic ferment mash for developing active alcoholic ferment cells possessing fermenting properties similar to but more effective than those of the substance commonly known as yeast mash for use in the arts, in a more effective condition and more economically than by the old process of making yeast mash.

In the old process of making yeast mash ground rye, &c., and ground malt are heated with water to a proper temperature and consistency, and yeast then added for multiplication.

In my process of preparing alcoholic ferment mash I use brans of different cereals, including shorts, middlings, &c., (which are cheaper and more efficient than whole or comminuted grains of cereals,) and taka-koji or taka-koji diastase, thus enriching the mash with nitrogenous ingredients, or ferment cell-forming ingredients to an extent of from four to six times, and with comparatively small but sufficient quantity of saccharine matter.

The object of using taka-koji or taka-koji diastase is to induce or cause the nitrogenous matter of brans, &c., to change into a more assimilable condition for the multiplication of ferment cells, and also in the conversion of any starchy matter, contained in the brans, into sugars. I have discovered that the mash made by using the taka-koji and especially the taka-koji diastase mixed with brans produces a medium for developing and multiplying the ferment cells far superior to any other, and that the ferment cells thus developed possess greater activity and ferment power than any other ferment cells.

In my process of preparing alcoholic ferment mash, wheat bran and the brans of other cereals or their mixtures, including shorts, middlings, &c., mixed with from three to ten per cent. in weight of taka-koji, or of taka-koji diastase corresponding to three to ten per cent. of taka-koji, is added to a quantity of water of about from four to eight times the weight of the mass and heated gradually up to about 65° centigrade. After remaining at that temperature for from fifteen to thirty minutes the temperature is raised to boiling point and kept at that temperature for from ten to twenty minutes. The mash is then cooled down to about 60° centigrade when there is again introduced into the mass from three to ten per cent. of the weight of the original mass before water was added, of taka-koji, or the taka-koji diastase, corresponding to that percentage of taka-koji, for the conversion of the remaining starch. The liquid portion is then separated from the solid materials by any suitable means, the most simple being to pass the mash through the ordinary false bottom tub, the bran itself acting as a filter for the liquid portion. The liquid thus separated from the solid materials is rapidly heated to boiling point, and retained at that point a sufficient period to sterilize the liquid, which is accomplished in a few (ten to twenty) minutes. Any insoluble matter remaining in the liquid is allowed to settle or is filtered out. The clear liquid is then quickly cooled to a temperature of from 12° to 35° centigrade and is then in condition for the introduction of ferment cells for development and multiplication.

I prefer to employ the ferment cells which I have termed taka-moto for the preparation and making of which I have pending in the United States Patent Office an application for patent, Serial No. 396,705, filed June 18, 1891.

After the clear liquid is in condition the taka-moto is added, there being no special requirement as to the amount, or any particular proportion between the amount of the clear liquid and ferment cells to be added. A large amount of taka-moto will complete the development and multiplication of the ferment cells somewhat earlier than a small amount, but the proper proportion to be added will be readily understood by those skilled in the art.

After the taka-moto has been added the mash is allowed to stand for from twelve to sixty hours until the ferment cells of the taka-moto settle to the bottom and their further development and multiplication practically ceases leaving the upper liquid bright and clear. The settled ferment cells are separated, washed with water and may be made into a pasty mash or pressed into some solid form or otherwise treated, and used for various applications in the arts, such as bread making, brewing, &c.

The supernatant liquid contains but a small percentage of alcohol but it may be saved and utilized by distillation.

Having thus described my invention, what I claim as new, and desire to secure by Letters Patent of the United States, is—

1. The process of cultivating and developing alcoholic ferment cells, which consists in heating gradually to the boiling point, a mixture of the bran of the cereals, the diastase of taka-koji, and water, in the proportions specified; adding, after cooling, a portion of the diastase of taka-koji, equal to that first introduced into the mixture; separating and sterilizing the liquid portion; and adding to the clarified liquid ferment cells for development and multiplication, under the temperature and manipulation specified, all substantially as described.

2. The process of cultivating and developing alcoholic ferment cells, which consists in heating gradually to a boiling point, a mixture of the bran of the cereals, the diastase of taka-koji, and water, in the proportions specified; adding, after cooling, a portion of the diastase of taka-koji, equal to that first introduced into the mixture; separating and sterilizing the liquid portion; adding to the clarified liquid, ferment cells for development and multiplication, at the temperatures and under the manipulation specified; drawing off the clarified liquid; washing with water; the settled ferment cells, to be formed into a pasty or semi-solid mass; all substantially as described.

3. The process for preparing a mash for the cultivation and development of alcoholic ferment cells, which consists in heating gradually to the boiling point, a mixture of the bran of the cereals, the diastase of taka-koji, and water, in the proportions specified; adding, after cooling, a portion of the diastase of taka-koji, equal to that first introduced into the mixture; separating the liquid portion from the mixture and sterilizing the same, and allowing the same to rest and cool; all substantially as described.

In testimony whereof I have hereunto set my hand in the presence of two witnesses.

JOKICHI TAKAMINE.

Witnesses:
  E. V. HITCH,
  S. R. YAMADA.